(12) United States Patent
Fredlund et al.

(10) Patent No.: US 8,667,053 B2
(45) Date of Patent: Mar. 4, 2014

(54) SYSTEM AND METHOD OF SHARING IMAGES

(75) Inventors: John R. Fredlund, Rochester, NY (US); Joseph A. Manico, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 964 days.

(21) Appl. No.: 11/934,809

(22) Filed: Nov. 5, 2007

(65) Prior Publication Data

US 2008/0056468 A1    Mar. 6, 2008

Related U.S. Application Data

(63) Continuation of application No. 10/325,350, filed on Dec. 19, 2002, now abandoned.

(51) Int. Cl.
*G06F 15/16*    (2006.01)

(52) U.S. Cl.
USPC ............................................ 709/203; 709/206

(58) Field of Classification Search
USPC ................... 709/204–207, 217–219
See application file for complete search history.

(56) References Cited

U.S. PATENT DOCUMENTS

| | | | |
|---|---|---|---|
| 5,164,831 A | 11/1992 | Kuchta et al. | |
| 5,206,743 A | 4/1993 | Hochman et al. | |
| 5,666,215 A | 9/1997 | Fredlund et al. | |
| 5,758,194 A | 5/1998 | Kuzma | |
| 5,760,917 A * | 6/1998 | Sheridan | 358/442 |
| 5,872,637 A | 2/1999 | Nakanishi | |
| 5,949,551 A | 9/1999 | Miller et al. | |
| 6,148,333 A | 11/2000 | Guedalia et al. | |
| 6,195,696 B1 | 2/2001 | Baber | |
| 6,278,531 B1 | 8/2001 | Tesavis | |
| 6,301,607 B2 * | 10/2001 | Barraclough et al. | 709/204 |
| 6,442,573 B1 | 8/2002 | Schiller et al. | |
| 6,493,722 B1 | 12/2002 | Daleen et al. | |
| 6,578,072 B2 | 6/2003 | Watanabe et al. | |
| 6,707,999 B2 | 3/2004 | Iwagaki et al. | |
| 6,874,084 B1 * | 3/2005 | Dobner et al. | 713/156 |
| 6,968,177 B2 | 11/2005 | Miller | |
| 7,068,309 B2 * | 6/2006 | Toyama et al. | 348/231.5 |

(Continued)

FOREIGN PATENT DOCUMENTS

| | | |
|---|---|---|
| DE | 4032462 A1 | 4/1992 |
| DE | 19756520 A1 | 7/1998 |

(Continued)

OTHER PUBLICATIONS

Peterson et al., Computer Networks: A System Approach, 2 ed. (Oct. 1, 1999), pp. 251-253.*

(Continued)

*Primary Examiner* — Brendan Higa

(57) ABSTRACT

A system and method for facilitating asynchronous transmission of digital data between at least two parties over a communication network. The system comprises a digital data facilitator having a digital storage device for storing digital data transmitted over the communication network from a first party, the digital data facilitator having the ability to review a request transmitted from a second party, the digital data having an associated first and second identifier, the second identifier being associated with the second party, the second identifier being associated with a telephone number, the first identifier being associated with an electronic identifier of the first party.

14 Claims, 10 Drawing Sheets

(56) References Cited

U.S. PATENT DOCUMENTS

| | | | |
|---|---|---|---|
| 7,190,475 | B2 | 3/2007 | Nomoto |
| 7,243,153 | B2* | 7/2007 | McIntyre et al. ............. 709/229 |
| 2002/0126159 | A1* | 9/2002 | Pilu ............................... 345/838 |
| 2002/0184318 | A1 | 12/2002 | Pineau |
| 2003/0023736 | A1 | 1/2003 | Abkemeier |
| 2003/0037111 | A1* | 2/2003 | Yoshioka ...................... 709/205 |
| 2003/0063770 | A1* | 4/2003 | Svendsen et al. ............. 382/100 |
| 2004/0070678 | A1* | 4/2004 | Toyama et al. ............ 348/231.3 |
| 2004/0111443 | A1 | 6/2004 | Wong |
| 2005/0160289 | A1* | 7/2005 | Shay ............................. 713/201 |

FOREIGN PATENT DOCUMENTS

| | | |
|---|---|---|
| EP | 1223742 A1 | 7/2002 |
| GB | 2310569 A | 8/1997 |
| WO | 97/07468 | 2/1997 |

OTHER PUBLICATIONS

PC Card Standard, Release 2.0, Sep. 1991—Personal Computer Memory Card Internatinal Assocation (PCMCIA).

CF+ as Compact Flash Specification Revision 1.4, 1998-1999 Compact Flash Assocation.

PCT Application—WO 01/22297 A1—entitled: Digital Media Frame, Publication Date: Mar. 29, 2001.

Communication from the European Patent Office on EP Application 03078833.5, dated May 9, 2007.

Communication from the European Patent Office on EP Application 03078833.5, dated Jul. 5, 2005.

European Search Report for EP Application 03078833.5, dated Nov. 3, 2004.

Final Rejection on U.S. Appl. No. 10/325,350, mailed Feb. 1, 2008.

Non-Final Office Action on U.S. Appl. No. 10/325,350, mailed Apr. 28, 2009.

Non-Final Office Action on U.S. Appl. No. 10/325,350, mailed Aug. 16, 2007.

Non-Final Office Action on U.S. Appl. No. 10/325,350, mailed Sep. 25, 2006.

* cited by examiner

SYSTEM AND METHOD OF SHARING IMAGES

CROSS-REFERENCE TO RELATED APPLICATIONS

This is a continuation of application Ser. No. 10/325,350, filed Dec. 19, 2002 now abandoned

FIELD OF THE INVENTION

The invention relates generally to the field of digital imaging, and in particular to the transmission of digital images. More specifically, the invention relates to a system and method of sharing images between two parties.

BACKGROUND OF THE INVENTION

Various methods are available to share digital images between two parties. One known method is to attach a digital file comprising a digital image as part of an electronic message, for example, e-mail. When the recipient receives the electronic message, the digital file can be detached and the image viewed. Another known method employs on-line service providers, for example Ofoto, Inc., a subsidiary of Eastman Kodak Company. On-line service providers support websites/databases, which permit a user to store/access/share digital images between two or more parties. For example, using a website, a user can arrange a collection of images which can be viewed by individuals authorized by the user. These authorized individuals can view the collection of images and can order prints of the images.

While such systems may have achieved certain degrees of success in their particular applications, some systems have disadvantages. Some systems require the use of a computer, and therefore, the user needs to be computer literate to send/receive an image. Further, some websites where the images reside are of questionable security. In addition, some websites require that a user "register" in order to obtain a password to allow sharing and prevent unwanted viewing of personal images. Still other systems are fee-based. For example, some systems charge a monthly service fee to the user to store and/or share their images regardless of the usage of the system. Yet other systems charge a service fee to a recipient of the images to receive images sent by a sender. Still other systems allow the practice of "spamming" of unwanted/unsolicited images to recipients.

Accordingly, a need exists for a system and method of sharing images between at least two parties, which can, but does not require, the use of a computer to send/receive images. Still further, such a system and method should not allow for receipt of unwanted or unsolicited images. Yet further, if such a system and method includes a fee, such a fee should be based on usage.

The system and method of the present invention provides for the sharing of images between at least two parties. The system and method can, but does not require, the use of a computer to send/receive images. The system and method provides for the receipt of wanted and solicited images. A fee can be employed, wherein the fee is based on usage.

SUMMARY OF THE INVENTION

An object of the present invention is to provide a system and method for sharing images between at least two parties.

Another object of the present invention is to provide such a system and method which can, but does not require, the use of a computer.

A further object of the present invention is to provide such a system and method, which provides for the receipt of wanted and solicited images.

A still further object of the present invention is to provide such a system and method which, if a fee is employed, employs a fee which is based on usage.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a system for facilitating asynchronous transmission of digital data between at least two parties over a communication network. The system comprises a digital data facilitator having a digital storage device for storing digital data transmitted over the communication network from a first party, the digital data facilitator having the ability to review a request transmitted from a second party, the digital data having an associated first and second identifier, the second identifier being associated with the second party, the second identifier being associated with a telephone number, the first identifier being associated with an electronic identifier of the first party.

According to another aspect of the invention, there is provided a method for facilitating asynchronous transmission of digital data between a first and second party over a communication network. The method comprises the steps of: transmitting the digital data over the communication network from the first party to a digital data facilitator having a digital storage device, the digital data having an associated first and second identifier, the first identifier being associated with an electronic identifier of the first party, the second identifier being associated with a telephone number of the second party; storing the digital data on the digital storage device; reviewing a request transmitted from the second party to the digital data facilitator; employing the digital data facilitator to identify the first party and the second party; determining the absence or presence of the digital data stored on the digital storage device having the associated first and second identifier associated with the first and second party, respectively; and fulfilling the request if the digital data is present.

According to a further aspect of the invention, there is provided a method for facilitating asynchronous transmission of digital data between a first and second party over a communication network. The method comprises the steps of: transmitting the digital data over the communication network from the first party to a digital data facilitator having a digital storage device, the digital data having an associated first and second identifier, the first identifier being associated with an electronic identifier of the first party, the second identifier being associated with a telephone number of the second party; storing the digital data on the digital storage device; reviewing a request transmitted from the second party to the digital data facilitator, the request comprising the first identifier; accessing the first identifier from the request; accessing the second identifier of the second party transmitting the request; accessing the digital data stored on the digital storage device having the associated first and second identifier; and fulfilling the request.

According to yet another aspect of the invention, there is provided a system for facilitating asynchronous transmission of digital data between a first and second party over a communication network. The system comprises a digital data facilitator having a digital storage device for storing the digital data transmitted over the communication network from the first party, the digital data facilitator having the ability to transmit the digital data to the second party in response to a request transmitted to the digital data facilitator from the second party subsequent to a communication sent to the second party from the digital data facilitator, a first identifier and a second identifier being associated with the digital data, the first identifier being associated with the first party, the second identifier being associated with a telephone number of the second party; a communication device for sending the communication to the second party over the communication network; and a transaction facilitator adapted to monitor the digital data being transmitted over the communication network.

According to a still further aspect of the invention, there is provided a method for facilitating asynchronous transmission of digital data between a first and second party over a communication network. The method comprises the steps of: transmitting the digital data over the communication network from the first party to a digital data facilitator having a digital storage device, the digital data having an associated first and second identifier, the first identifier being associated with an electronic identifier of the first party, the second identifier being associated with a telephone number of the second party; storing the digital data on the digital storage device; employing the digital data facilitator to identify the first party and the second party; sending a communication to the second party over the communication network; reviewing a request transmitted from the second party to the digital data facilitator in response to the communication sent to the second party; and transmitting the digital data to the second party in response to receiving the request from the second party.

According to yet another aspect of the invention, there is provided a system for facilitating asynchronous transmission of digital data between at least two parties over a communication network, comprising: a digital data facilitator having a digital storage device for storing the digital data transmitted over the communication network from a sender, a recipient identifier and a sender identifier being associated with the digital data, the digital data facilitator having the ability to transmit the digital data to a recipient, the recipient identifier being associated with the recipient, the digital data facilitator having an associated facilitator identifier associated with the digital data facilitator; and an identification system for detecting the facilitator identifier.

According to a still further aspect of the invention, there is provided a method for facilitating asynchronous transmission of digital data between a first and second party over a communication network. The method comprises the steps of: transmitting the digital data over the communication network from the first party to a digital data facilitator having a digital storage device, a first identifier and a second identifier being associated with the digital data, the second identifier being associated with the second party, a facilitator identifier being associated with the digital data facilitator; storing the digital data on the digital storage device; employing the digital data facilitator to identify the second party associated with the transmitted digital data; transmitting the digital data to the second party, the digital data including the facilitator identifier; employing an identification system, located remotely from the digital data facilitator, to determine if the facilitator identifier transmitted with the transmitted digital data is associated with the digital data facilitator; and receiving the transmitted digital data if the facilitator identifier transmitted with the transmitted digital data is determined to be associated with the digital data facilitator.

According to a still yet another aspect of the invention, there is provided a system for generating an image bearing product, comprising: a digital data facilitator having a digital storage device for storing digital data transmitted from a first party, the digital data facilitator having the ability to review a request for the image bearing product transmitted by the first party with regard to the digital data, the digital data having an associated first and second identifier, the second identifier being associated with a delivery address of the second party, the first identifier being associated with a telephone number of the first party; a communication network for transmitting the digital data from the first part to the digital data facilitator and for transmitting the digital data to a service provider for generating the image bearing product in accordance with the request; delivery means for delivering the image bearing product to the second party at the second party address; and a transaction facilitator for monitoring the transmission of the digital data and generation of the image bearing product and transmitting a bill to the telephone number of the first party.

According to a further aspect of the invention, there is provided a method for generating an image-bearing product. The method comprises the steps of: transmitting digital data over a communication network from the first party to a digital data facilitator having a digital storage device, the digital data having an associated first and second identifier, the second identifier being associated with a telephone number of the second party, the first identifier being associated with a telephone number of the first party; storing the digital data on the digital storage device for a predetermined period of time; receiving a product request from the second party for the image bearing product after the elapse of the predetermined period of time; transmitting a data request to the first party for the digital data; receiving the digital data in response to the data request; transmitting the digital data to a service provider to generate the image bearing product in accordance with the request; delivering the image bearing product to the second party at the second party address; and billing the telephone number of the first party for the generation of the image bearing product.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
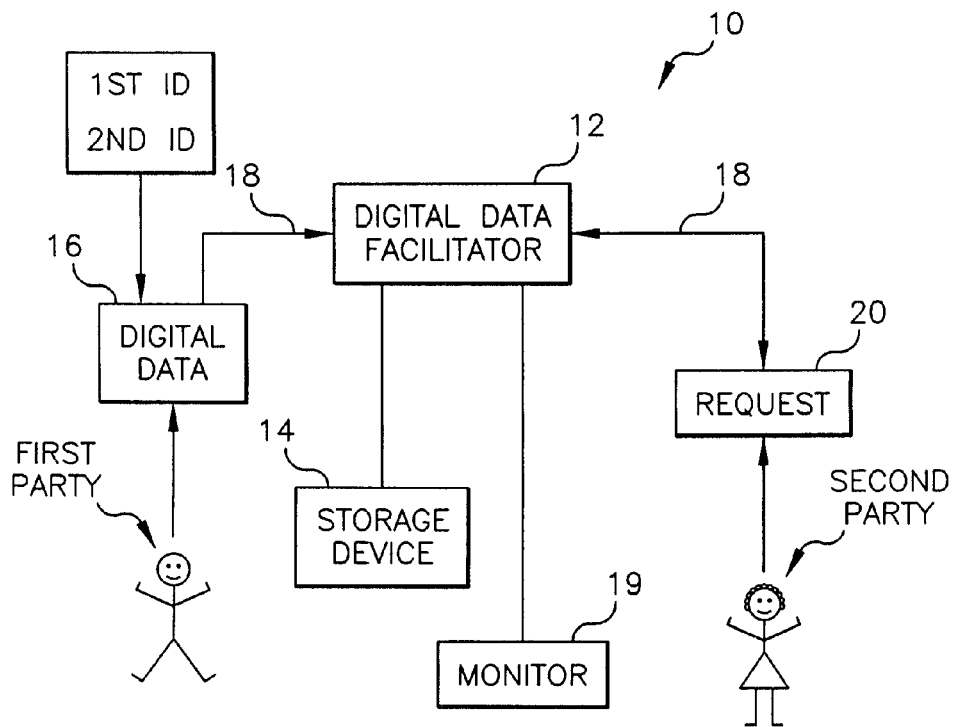
FIG. 1 shows a system for facilitating asynchronous transmission of digital data between a first party and a second party over a communication network in accordance with a first embodiment of the present invention.

The following is a detailed description of the preferred embodiments of the invention, reference being made to the drawings in which the same reference numerals identify the same elements of structure in each of the several figures.

The present invention is directed to the asynchronous transmission of digital data between at least two parties over a communication network. By asynchronous it is meant that the transmission is not occurring at the same time. That is, that each operation is completed only after the preceding operation is completed. Accordingly, asynchronous does encompass such transmissions as email. In other words, both the sender and receiver of a message need not be connected together at a particular point in time.

The present invention is suited for the transmission of digital data wherein the digital data defines a digital still image. However, the present invention is not limited to the transmission of digital still images. The digital data transmitted in accordance with the present invention can include video clips and sound.

The present invention encompasses several embodiments. In a first embodiment, a recipient of the digital data places a request for the digital data. In a second embodiment, an automated service informs the recipient when the digital data is available for receipt. In a third embodiment, an automated service determines when the digital data is available for provides for automatic receipt of the digital data. In a fourth embodiment, an image-bearing product is produced.

First Embodiment. A first embodiment of the present invention relates to a system for facilitating asynchronous transmission of digital data between at least two parties over a communication network wherein a recipient of the digital data transmits a request for the digital data.

Referring to FIG. 1, there is shown a system 10 for facilitating asynchronous transmission of digital data between a first party (i.e., a sender) and a second party (i.e., a recipient) over a communication network. As will be discussed, system 10 of the first embodiment can, but does not require, the use of a computer or other processor. System 10 includes a digital data facilitator 12 having a digital storage device 14 for storing the digital data 16 transmitted over a communication network 18 from a first party (S) to digital data facilitator 12. Digital data facilitator 12 can be any device adapted to facilitate the transmission of digital data, including but not limited to a computer, a server, or a network of computers or servers. Digital data facilitator 12 further comprises a transaction facilitator 19 for monitoring the transmission of digital data 16 to/from digital data facilitator 12, as well as monitoring the length of storage of digital data 16 on storage device 14. Digital data facilitator 12 is configured to review a request 20 transmitted from a second party. Associated with digital data 16 is a first ID1 and second ID2 identifier. As will become evident, second identifier ID2 is associated with the second party. Second identifier ID2 is also associated with a telephone number of the second party. First identifier ID1 is associated with an electronic identifier of the first party.

Figure 2:
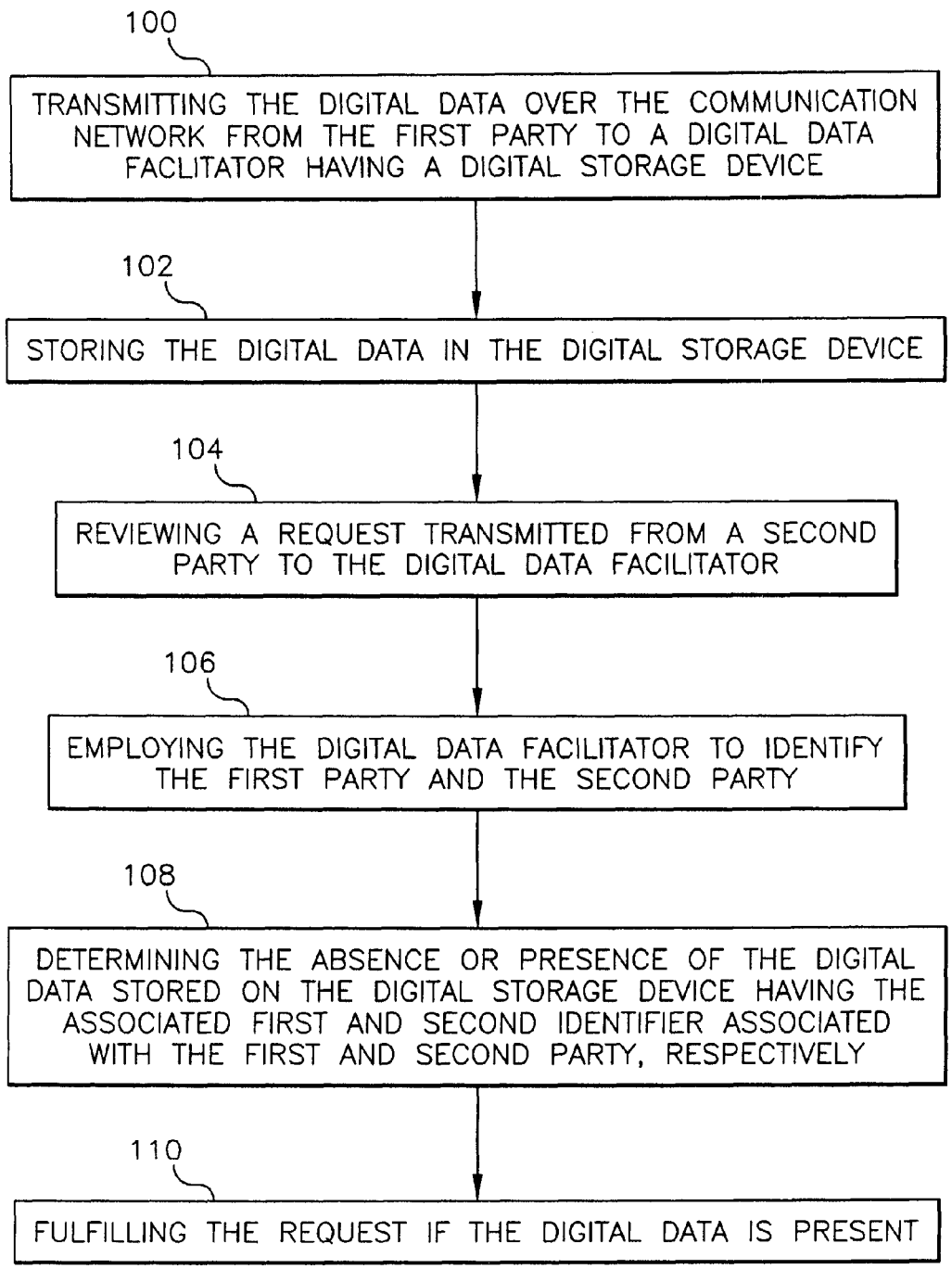
FIG. 2 shows a flow diagram of a method in accordance with the present invention employing the system of FIG. 1.

A diagram of a first method employing system 10 of FIG. 1 is shown in FIG. 2. The method relates to facilitating asynchronous transmission of digital data between a first and second party over a communication network. At step 100, digital data 16 is transmitted over communication network 18 from the first party to digital data facilitator 12 having digital storage device 14. Digital data 16 is stored (such as in a data file) on digital storage device 14 (step 102). Request 20 is transmitted from the second party to digital data facilitator 12 (step 104). At step 106, digital data facilitator 12 identifies the first party and the second party, and determines the absence or presence of digital data 16 stored on digital storage device 14 having the associated first and second identifier associated with the first and second party, respectively (step 108). If digital data 16 is present, the request is fulfilled (step 110).

The method shown in FIG. 2 is now more particularly described with an example. In the particular example, a mother (i.e., the second party) lives in a location (e.g., Wisconsin) remote from where her several grown children (i.e., the first party) live (e.g., California, New York, and Florida). Accordingly, the first party is any one of the children, and the second party is the mother. The mother enjoys receiving images/photographs from her children.

At least one of the children (i.e. the first party) accesses at least one image in digital form (i.e., digital data 16) which she desires to share with her mother. It is well known that an image can be captured in a digital form using a digital image capture device, for example, a digital camera. Alternatively, a scanner or other device can be employed to convert a hard copy print of an image to digital form. Once accessed, the child transmits (step 100) the at least one image, in digital form, over communication network 18 to digital data facilitator 12.

The child can transmit digital data 16 from devices known to those skilled in the art. For example, the child can transmit digital data 16 from a computer, whereby communication network 18 would be the internet or the like. Alternatively, the child can transmit digital data 16 from a digital camera or other digital imaging device, whereby communication network 18 can be a telephone line, wireless communication, the internet, or the like. Communication network can be a low band-width communication system, for example, a standard voice network (POTS), a cellular phone or an ISDN network.

Digital data 16 can comprise audio. That is, the device which converts data to digital data 16 can include means, such as a microphone, to record audio information.

It is recognized that the communication network 18 transmitting digital data 16 to digital data facilitator 12 does not need to be the same communication network 18 transmitting digital data 16 to the first party. What communication network employed is dependent on the device being employed to transmit the communication.

In transmitting the digital image, the child associates first identifier ID1 to digital data 16, wherein first identifier ID1 is an electronic identifier of the first party, that is, associated with the child. An example of first identifier ID1 is a telephone number for the child, an email address for the child, an internet address, or the like. As such, first identifier ID1 can be employed to identify the originator of digital data 16. In transmitting the digital image, second identifier ID2 is associated with digital data 16. Second identifier ID2 is associated with the second party. More particularly, second identifier ID2 is a telephone number for the mother.

Once transmitted, at step 102 digital data 16 is stored on storage device 14 of digital data facilitator 12. Digital data facilitator 12 can be located at any location, local or remote from the first or second party.

The mother enjoys receiving images/photographs from her children. Accordingly, the mother transmits a request to digital data facilitator 12 to determine if there are any images from any one of her children. That is, request 20 is transmitted indicating that the mother is interested in learning whether any images have been transmitted to digital data facilitator 12 that are intended for the mother.

Request 20 can be transmitted by the second party by means known to those skilled in the art. For example, if the mother has a computer, the mother can transmit request 20 employing the computer. Alternatively, other electronic devices can be employed, including, but not limited to a telephone, a PDA (personal digital assistant), wireless communicator, or the like. Preferably, the mother transmits the request by telephone since one of the objects of the present invention is to provide a method of asynchronous transmission of digital data between two parties wherein the requesting party is not employing a computer. As such, the mother could dial a predetermined sequence of numbers to transmit request 20, or the number or address of the digital data facilitator can be pre-programmed into her device.

When transmitted, second identifier ID2 associated with the second party is associated with request 20. Accordingly, when request 20 is reviewed (step 104), digital data facilitator 12 is able to identify the mother as the requestor.

Digital data facilitator 12 accesses the plurality of digital data stored in storage device 14 to determine if storage device 14 includes any digital data having second identifier ID2 associated to the digital data (step 108). That is, facilitator 12 determines if any of the stored digital data is intended for receipt by the mother. If no such digital data is found, the request is not fulfilled. If such digital data is found, digital data facilitator 12 accesses the stored digital data and identifies the first party who transmitted the stored digital data by accessing first identifier ID1, and the request is fulfilled (step 110).

In a preferred embodiment, the method shown in FIG. 2 further comprises the step of, prior to fulfilling the request (step 110), determining if the second party will accept transmission of digital data 16 from digital data facilitator 12 to the second party. For example, on a particular day, the mother may only wish to receive images from her youngest child because that particular day is the youngest child's birthday. Accordingly, after determining the presence of stored digital data but prior to fulfilling request 20, the first party's identity (i.e., the identity associated with the stored digital data whose presence has been determined at step 108) can be provided to the mother to determine if she will accept transmission of the stored digital data. For this example, if the first party's identity is that of her youngest child, the mother would accept transmission. If the first party's identity is not that of her youngest child, the mother could postpone, delay, or refuse transmission. (System 10 could be configured to still allow the mother to accept transmission.) Alternatively, when request 20 is transmitted by the mother, request 20 can include information associated with the youngest child, such as first identifier ID1 associated with the youngest child. Whereby storage device 14 would search for image data only having associated therewith the transmitted first identifier ID1 (that is, the identifier associated with the youngest child) and second identifier ID2 associated with the mother.

The method shown in FIG. 2 can further include the step of sending a notice to the first party indicating successful transmission of digital data 16 to the second party. Alternatively, the notice can be delivered to the first party the next time the first party connects to the digital data facilitator. This step provides the first party with a confirmation. Such a confirmation may be desired in particular situations when several attempts need to be made to transmit digital data 16 to the second party, or when follow-up by means of a synchronous communications tool such as a telephone is desired after receipt of the transmission by the second party.

Similarly, the method shown in FIG. 2 can further include the step of sending a message to digital data facilitator 12 indicating that display device 22 is not ready or able to receive digital data 16. Such a situation can occur if display device 22 does not have sufficient memory or capacity to receive the digital data or communication network 18 is unable to transmit digital data 16.

Typically request 20 reviewed at step 104 is a request for the transmission of the digital data stored at step 102. As such, facilitator 12 transmits digital data 16 to a digital display device of the second party over communication network 18. If the mother's digital display device is configured as a computer, the mother can direct the transmission of digital data 16 to her computer whereby the images can be viewed. Alternatively, if the mother does not have a digital display device configured as a computer, the mother can direct the transmission of the images by means of her telephone line to another digital display device disposed at the mother's location.

Request 20 can be a request other than a request for transmission of digital image data. For example, audio files or text files converted from audio can be sent. Also, the digital image data can comprise video images.

Figure 3:
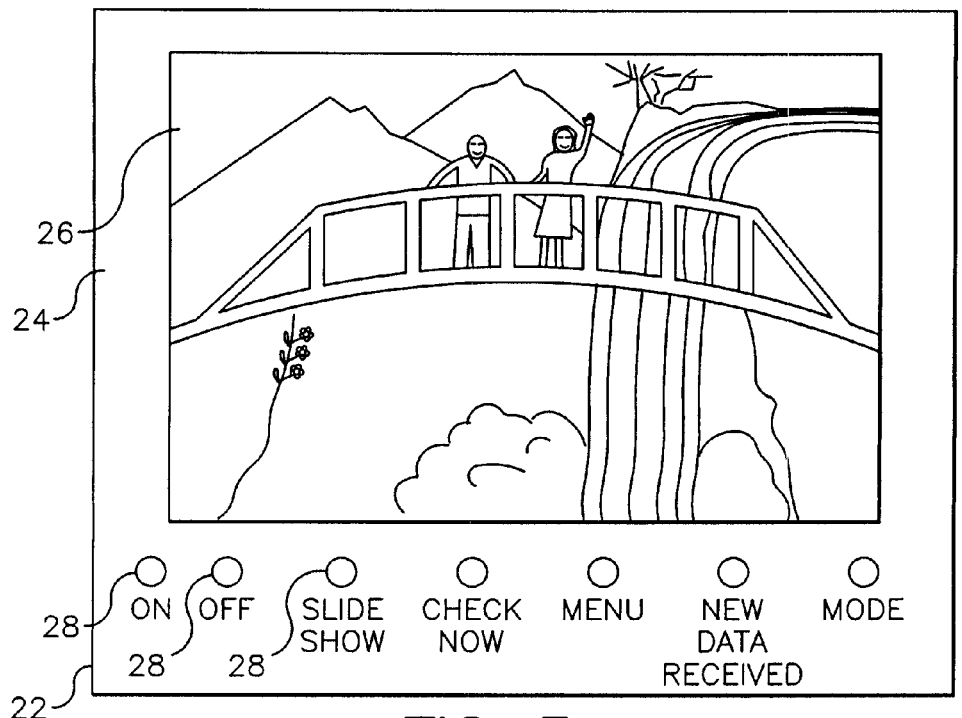
FIG. 3 shows a digital display device.

Referring to FIG. 3, there is shown as exemplary digital display device 22 including a non-image area 24 (shown in FIG. 3 as a frame 24) and an image area 26 adapted to display at least one digital image. A preferred digital display device 22 comprises a memory device adapted to store a plurality of images, whereby the plurality of images can be accessed, viewed, and/or stored. It is recognized that the number of images which can be stored on the display device is dependent on the resolution of the image transmitted and the memory device. Display device 22 can include one or more selection members/buttons 28 for providing instructions or operating various modes of display device 22. For example, selection member can include an ON/OFF mode. Further, selection member 28 can initiate a "slide show", that is, a continuous viewing of the images transmitted to display device 22. Still further, selection menu can operate a menu viewable on image area 26 listing the various modes of operation for display device 22. As such, it may be preferred to have image area 26 of display device 22 configured as a touchscreen. Yet further, selection member 28 might be a "check now" button which automatically initiates the transmission of request 20. That is, connection to digital data facilitator 12 is accomplished by pressing a button. Other selection members or modes may be known to those skilled in the art.

Fee Based. There might be a fee or cost associated with the method of the present invention. For example, there might be a fee associated with (1) use of communication network 18 to transmit digital data 16 to digital data facilitator 12 (step 100); (2) storage of digital data 16 on storage device 14 (step 102); (3) use of communication network 18 to transmit request 20; and/or (4) use of communication network to transmit digital data 16 from storage device 14 to the second party (step 110).

Therefore, digital data facilitator 12 includes transaction facilitator 19 for monitoring the transmission of digital data 16 to/from digital data facilitator 12, as well as monitoring the length of storage of digital data 16 on storage device 14. That is, transaction facilitator 19 is adapted to monitor the transmission of the digital data for a purpose of determining a transaction fee, which fees can be associated with the transmission and/or storage of digital data 16. Transaction facilitator 19 can include a billing application to prepare a billing statement. For example, the second party might arrange to pay all associated fees in order to receive images from the first party (e.g., a mother wanting to see photos from her only child away at college). Alternatively, the first party might arrange to pay all associated fees in order to send image to the second party (e.g., a child wanting to send photos to his mother located in a senior retirement center located in a warm climate). Still further, the fees could be divided by some arrangement between the first and second party. The fees collected could be divided by a predetermined arrangement between a telecommunication provider providing communication network 18 and a service provider providing the service of digital data facilitator 12. Fees could also be charged for storage of digital data 16 on storage device 14. For example, either party can request that the digital data be available for a predetermined length of time to ensure that the second party receives the digital data.

This fee-based arrangement of system 10 is suitable for both the frequent and infrequent user since the user pays only for the services used. The cost to the users is minimized. The infrequent user benefits from this arrangement since no monthly fee is charged. The party can be billed using an existing telephone account. By such a billing arrangement, the providers (telecommunication provider and/or service provider) can obtain the fees in a routine manner and in a reasonable timeframe.

Second Embodiment. In a second embodiment of the present invention, an automated service informs the second party when digital data is available for receipt. Accordingly, referring to FIG. 4, system 10 further includes a communication device 30 for sending a communication 32 to the second party over communication network 18. That is, communication 32 is sent to the second party when digital data intended for the second party is received by digital data facilitator 12.

Figure 4:
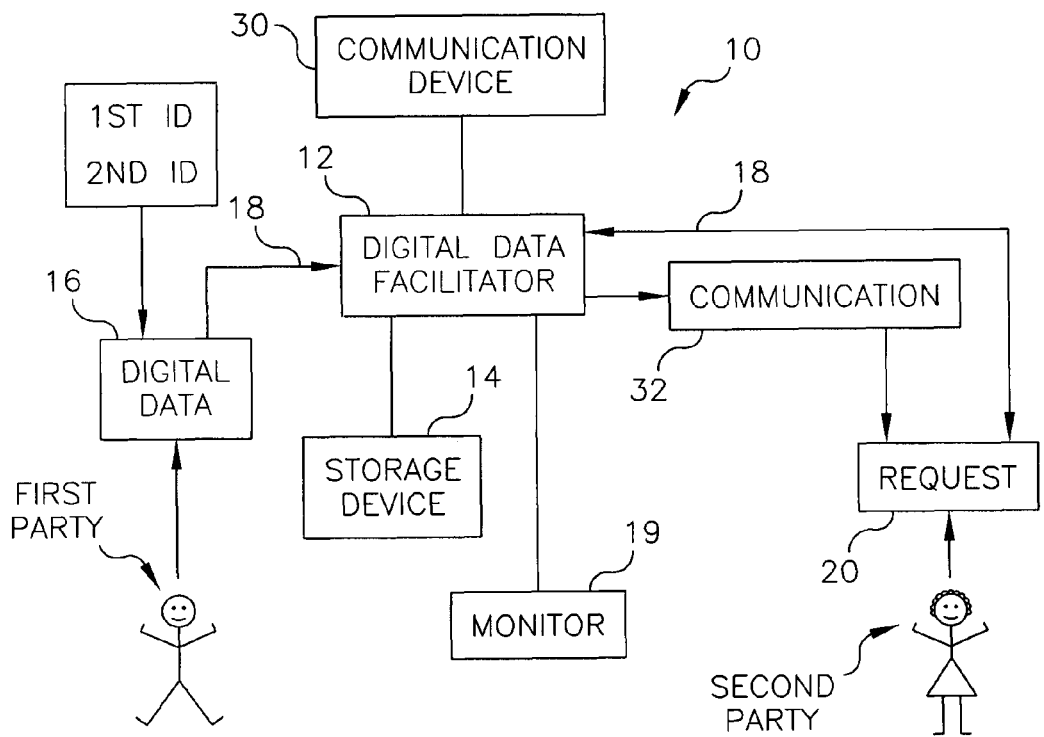
FIG. 4 shows a system for facilitating asynchronous transmission of digital data between a first party and a second party over a communication network in accordance with a second embodiment of the present invention.
Figure 5:
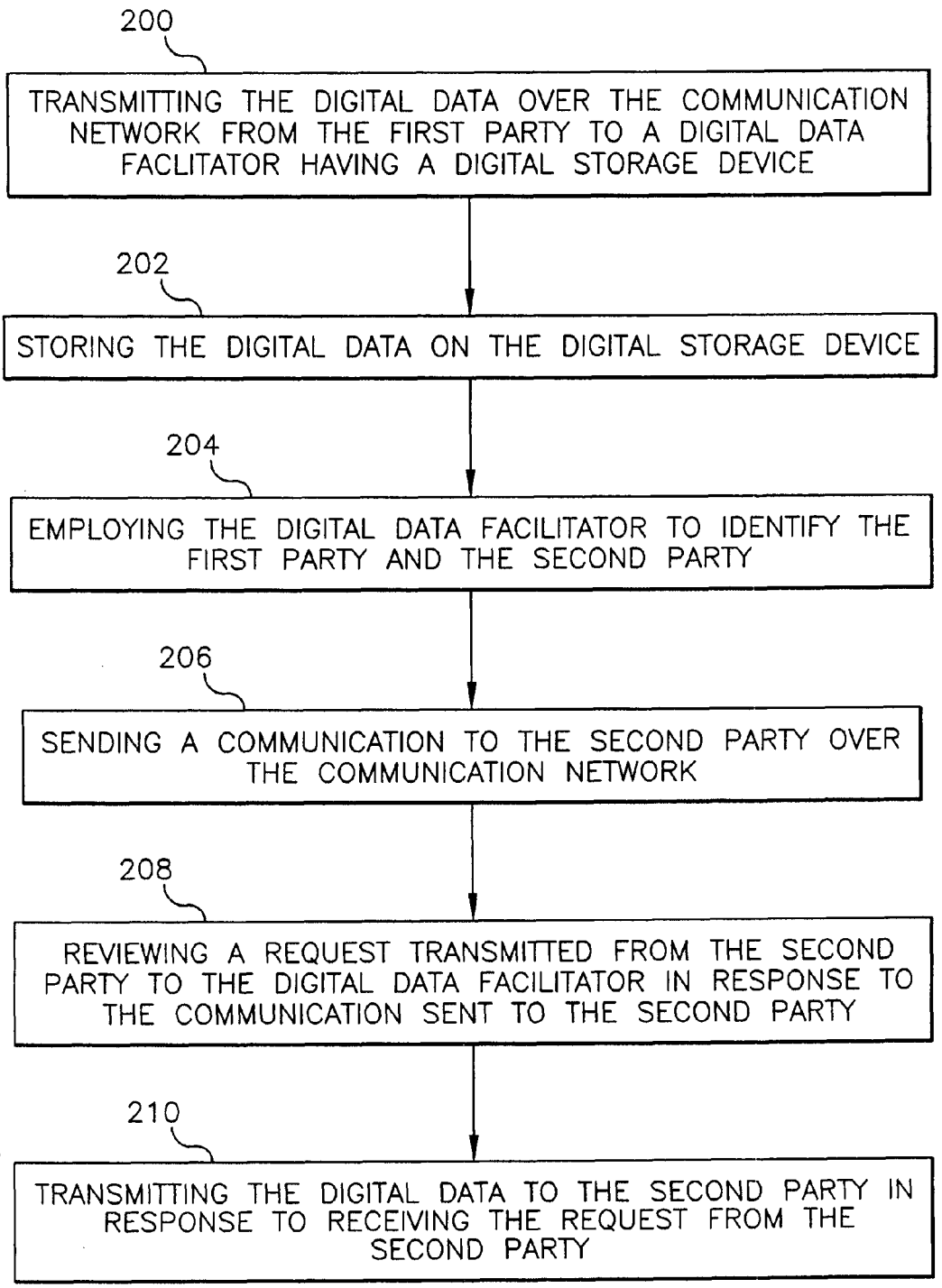
FIG. 5 shows a flow diagram of a method in accordance with the present invention employing the system of FIG. 4.

A diagram of a second method employing system 10 of FIG. 4 is shown in FIG. 5. The method relates to facilitating asynchronous transmission of digital data between a first and second party over a communication network. At step 200, digital data 16 is transmitted over communication network 18 from the first party to digital data facilitator 12 having digital storage device 14. Digital data 16 has associated therewith first identifier ID1 associated with an electronic identifier of the first party, and second identifier ID2 associated with a telephone number of the second party. At step 202, digital data 16 is stored on digital storage device 14. Then, digital data facilitator 12 is employed to identify the first party and the second party. Once the second party is identified, communication 32 is to the second party over communication network 18 (step 206) by means of communication device 30. Communication 32 can occur at predefined times that are acceptable to the second party as determined by a setup routine run on display device 22, or by means of parameters included in the data provided by the first party. In a preferred embodiment, the first party is identified in communication 32 so that the second party can determine whether to receive image data 16. If the second party desires to receive image data 16, the second party sends request 20. At step 208, request 20, transmitted from the second party to the digital data facilitator in response to communication 32, is reviewed. At step 210, digital data 16 is transmitted to the second party in response to receiving request 20 from the second party. If the second party is unable to receive the data at the time of initial contact, transmission may be delayed to another time.

The communication sent to the second party may take many forms. In one embodiment, the second party receives a voice message via the telephone. This voice message informs the second party that there is data waiting, and describes the sender. This description may be the ID of the first party, the name of the first party or a playback of a recorded voice message by the first party. For example, the second party can hear the message, "If you would like to receive images from 585-555-8243, press 5 and hang up". In another example, the second party can hear the message, "If you would like to receive images from the party who has left the following message, press 5 and hang up" whereafter the following message is delivered, "Hi Grandma, here is a picture of my new bike."

In accordance with the present invention, an automated service determines when the digital data is available for receipt and the second party automatically receives the digital data if sent from digital data facilitator 12. More particularly, if the second party is receiving digital data 16 by means of a telephone line, the second party's telephone line can be configured, using an identification system, to automatically receive digital data 16 if digital data facilitator 12 is the caller. Such an identification system can be the telephonic system generally referred to as "caller-id". Caller-id is well known in the telecommunication industry, and can be employed here to determine when digital data facilitator 12 is the caller. As such, the second party automatically receives digital data 16 from digital data facilitator. In a preferred embodiment, the second party configures the receiving device with caller-id to receive digital data 16 only from selected senders. That is, the second party pre-identifies the parties from whom he/she will receive digital data. This "prescreening" of the senders of the digital data ensures that the second party is not "spammed" by unwanted/unsolicited digital data from unknown third parties.

Third Embodiment. In a third embodiment, referring now to FIG. 6, system 10 further comprises an identification system 34 for verifying the sender (i.e., the first party) of the digital data. Identification system 34 can verify that the sender is digital data facilitator 12. If the second party is receiving digital data 16 by means of a telephone line, then identification system 34 can be a caller-id system.

The identification system can be located proximate the digital data facilitator. For example, if digital data facilitator 12 and identification system 34 are both provided/operated by the same communications company, they may be disposed at the same location. Alternatively, identification system 34 can be disposed remotely from digital data facilitator 12. For example, the second party may have an in-home device, which serves as an identification system. Such an in-home device might be a component of the second party's telephone or telephone answering machine.

Figure 6:
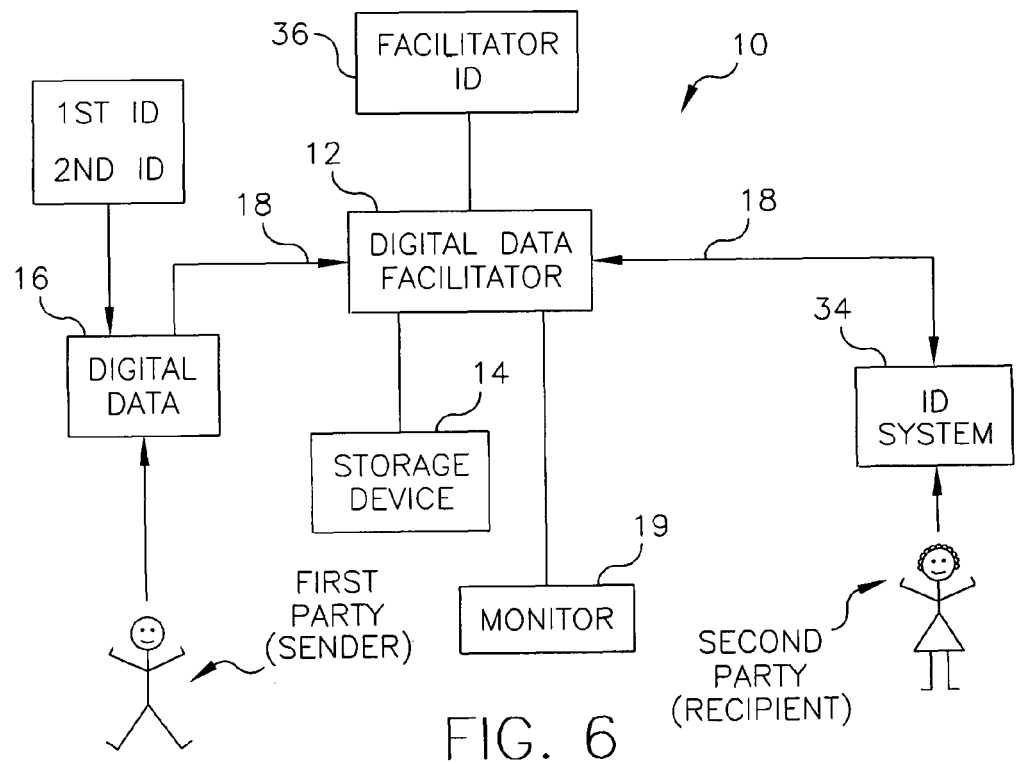
FIG. 6 shows a system for facilitating asynchronous transmission of digital data between a first party and a second party over a communication network in accordance with a third embodiment of the present invention.

More particularly, system 10 shown in FIG. 6 includes digital data facilitator 12 having digital storage device 14. A first and second identifier is associated with the digital data. The second identifier is associated with the second party (the recipient). Digital data facilitator 12 includes an associated facilitator identifier 36 associated with digital data facilitator 12. In a preferred embodiment, facilitator identifier 36 is a telephone number. System 10 further includes identification system 34, which as indicated above, can be proximate or remote from digital data facilitator 12, for detecting facilitator identifier 26. Transaction facilitator 19 can be employed to monitor digital data 16 being transmitted over the communication network between the parties.

It is recognized that for this particular embodiment employing a caller-id, that caller-id may not be able to recognize an email address. That is, for this particular embodiment, if the identification of the first party is an email address, this embodiment might not prevent the transmission of undesired digital data.

Figure 7:
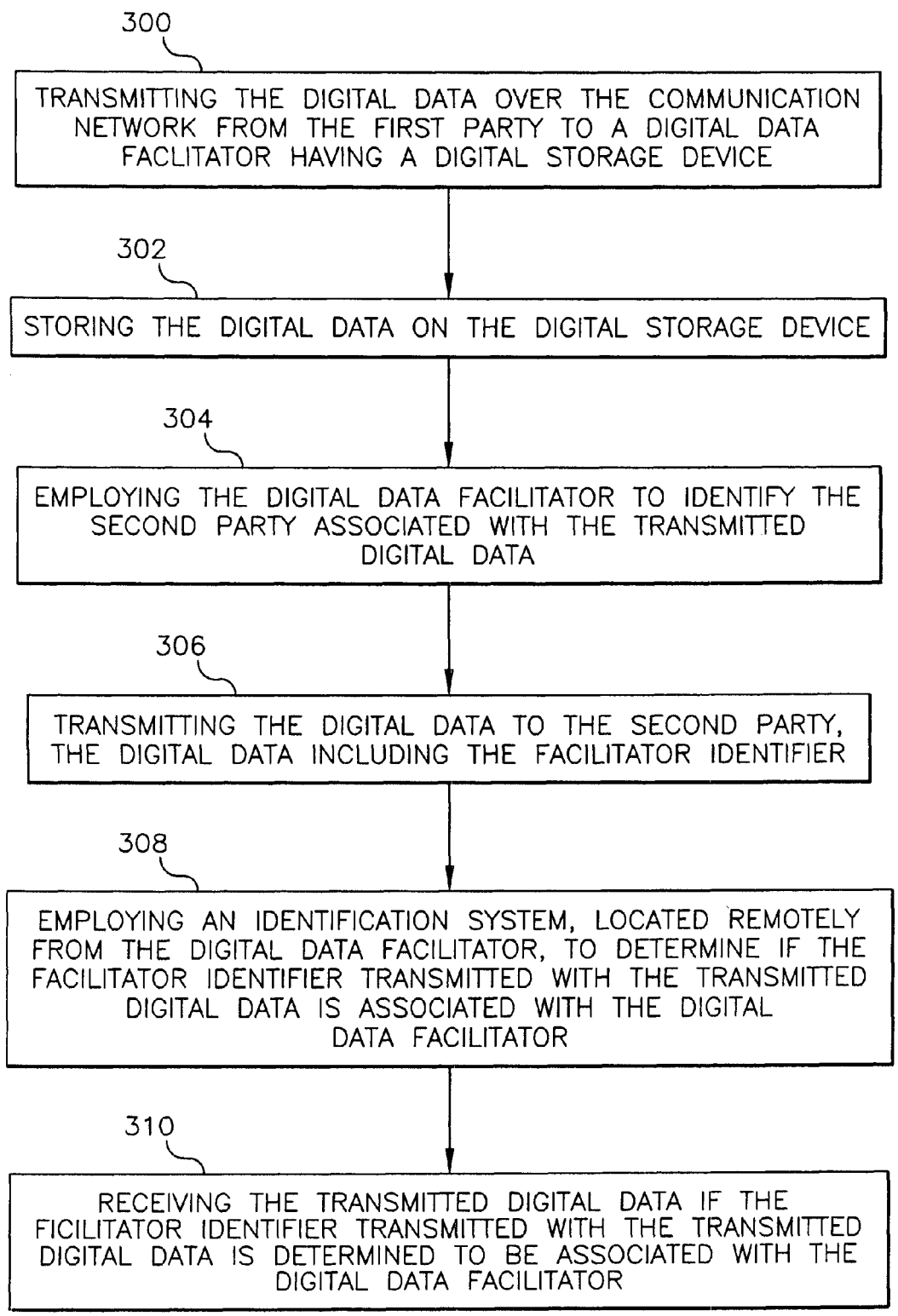
FIG. 7 shows a flow diagram of a method in accordance with the present invention employing the system of FIG. 6.

A diagram of a third method employing system 10 of FIG. 6 is shown in FIG. 7. At step 300, digital data 16 is transmitted over communication network 18 from the first party to digital data facilitator 12 having digital storage device 14. First identifier ID1 and second identifier ID2 are associated with digital data 16, with second identifier ID2 being associated with the second party. In addition, facilitator identifier 36 is associated with digital data facilitator 12. In a preferred embodiment, facilitator 36 is a telephone number associated with digital data facilitator 12. At step 302, digital data 16 is stored on digital storage device 14. Then, digital data facilitator 12 is employed to identify the second party associated with the transmitted digital data (step 304). At step 306, digital data 16 is transmitted to the second party, with the transmitted digital data including facilitator identifier 36. At step 308, identification system 34, located remotely from digital data facilitator 12, is employed to determine if facilitator identifier 36 transmitted with the transmitted digital data is correctly associated with digital data facilitator 12. If correctly associated, the transmitted digital data is received by the second party (step 310).

In a preferred embodiment, to reduce/eliminate the second party's receipt of unsolicited digital data, identification system 34 is pre-programmed with a list of first parties (i.e., first identifiers) from which the second party will accept receipt of digital data. Such a pre-programming can be accomplished by manually inputting telephone numbers into identification system 34. This adds a level of security to the system.

Figure 8:
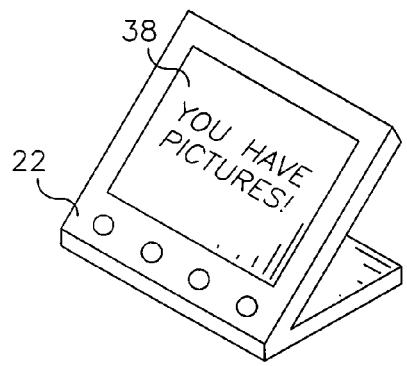
FIGS. 8 through 10 show systems for notifying a second party of the availability of digital data.

With the automatic transmission of digital data 16, a notification or indicator 38 can be provided to the second party to provide notice that digital data has been received. Such an indicator can be a visual indicator displayed on image area 26 of display device 22. FIG. 8 shows one example of a visual indicator 38 wherein a message of "YOU HAVE PICTURES!" is displayed when digital data is transmitted. Another example of a visual indicator is a button on the frame which lights up or flashes when digital data is transmitted.

Figure 9:
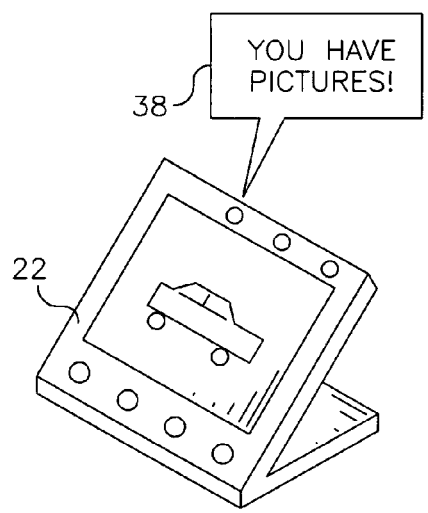
Figure 10:

Alternatively, indicator 38 can be an audio indicator, for example, referring to FIG. 9, an audio message of "YOU HAVE PICTURES" emanates from display device 22. Still further, rather than hearing a dial tone from the telephone when the telephone receiver is picked up, a message of "YOU HAVE PICTURES" can be heard.

In a particular arrangement, caller ID means may be employed at digital data facilitator 12 to ensure receipt of data by only specified parties. Digital data facilitator 12 can use caller ID to determine the identity of the first party when the data is initially transmitted. The identity of the first party is associated with the data file. The identity of the desired recipient second party is included with the transmission of the data from the first party to digital data facilitator 12. When the second party or display device 22 calls digital data facilitator 12, the second party is identified by the caller ID means. Additionally, the second party or display device 22 provides a listing of the identities of first parties from which the second party wishes to receive data. If the identity of the first party as determined by the caller ID means is on the list provided by the second party, and the identity of the second party as determined by the caller ID means matches the identity of the desired recipient second party included with the transmission of the data from the first party to digital data facilitator 12, the data will be transmitted to the second party.

Stated alternatively, the first party transmits a digital data file to digital data facilitator 12. The digital data in the file specifies the identity (phone number) of the second party. The identity of the first party is determined by the caller-id means. The identity of the first party is associated with the data file. When the second party contacts digital data facilitator 12, digital data facilitator 12 determines the identity of the second party by the caller-id means. Digital data facilitator 12 also receives a list of identities (i.e., first parties) from which the second party is willing to accept digital data. If the ids of the first party and the second party match, digital data facilitator 12 transmits the digital data to the second party.

Display device 22 may also be enabled to provide an audio message to the provider of the digital data (the first party). Upon selecting the "return message" function, the second party can record a voice message to the first party. This message is returned to the first party via digital data facilitator 12.

Figure 11:
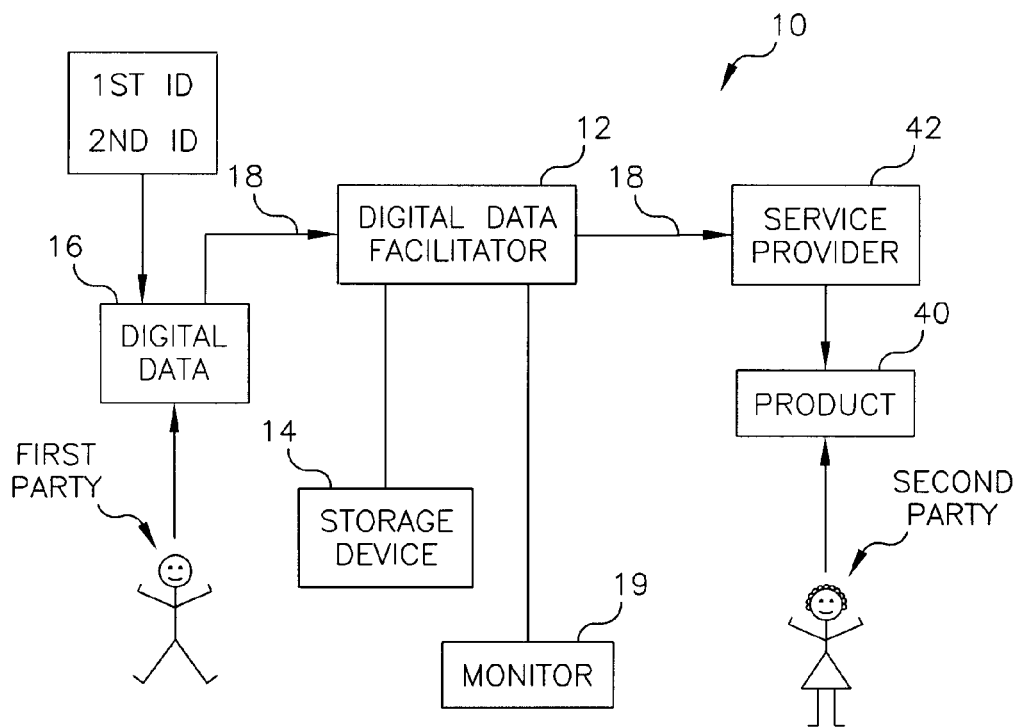
FIG. 11 shows a system in accordance with a fourth embodiment of the present invention.

Fourth Embodiment. Referring now to FIG. 11, in a fourth embodiment in accordance with the present invention, an image-bearing product 40 is produced. In this fourth embodiment, digital data 16 cannot be transmitted to the second party. Such a situation can occur for a plurality of reasons, for example, if the second party does not have a telephone, display device 22, a computer, or other digital display device adapted to receive digital data. Accordingly, in accordance with the fourth embodiment, image-bearing product 40 is automatically produced and delivered to the second party, and the first party's telephone number is billed.

As shown in FIG. 11, system 10 in accordance with the fourth embodiment includes digital data facilitator 12 having digital storage device 14 for storing digital data transmitted over communication network 18 from a first party. Digital data 16 has an associated first and second identifier, with the second identifier being associated with a delivery address of the second party, and the first identifier being associated with a telephone number of the first party. Communication network 18 permits the transmission of digital data 16 to a service provider 42 for generating the image-bearing product in accordance with the request. Delivery means are provided for delivering image bearing product 40 to the second party at the second party address. In addition, transaction facilitator 19 monitors the transmission of the digital data and generation of the image bearing product whereby a bill for the transmission and generation is sent to the telephone number of the first party.

It is recognized that image bearing product 40 can be any product comprising the digital data. Typically, product 40 is a hard copy print, such as an 4×6 or 8×10, but can include a compact disc, puzzle, poster, tee shirt, mug, or the like as known to those skilled in the art.

Figure 12:
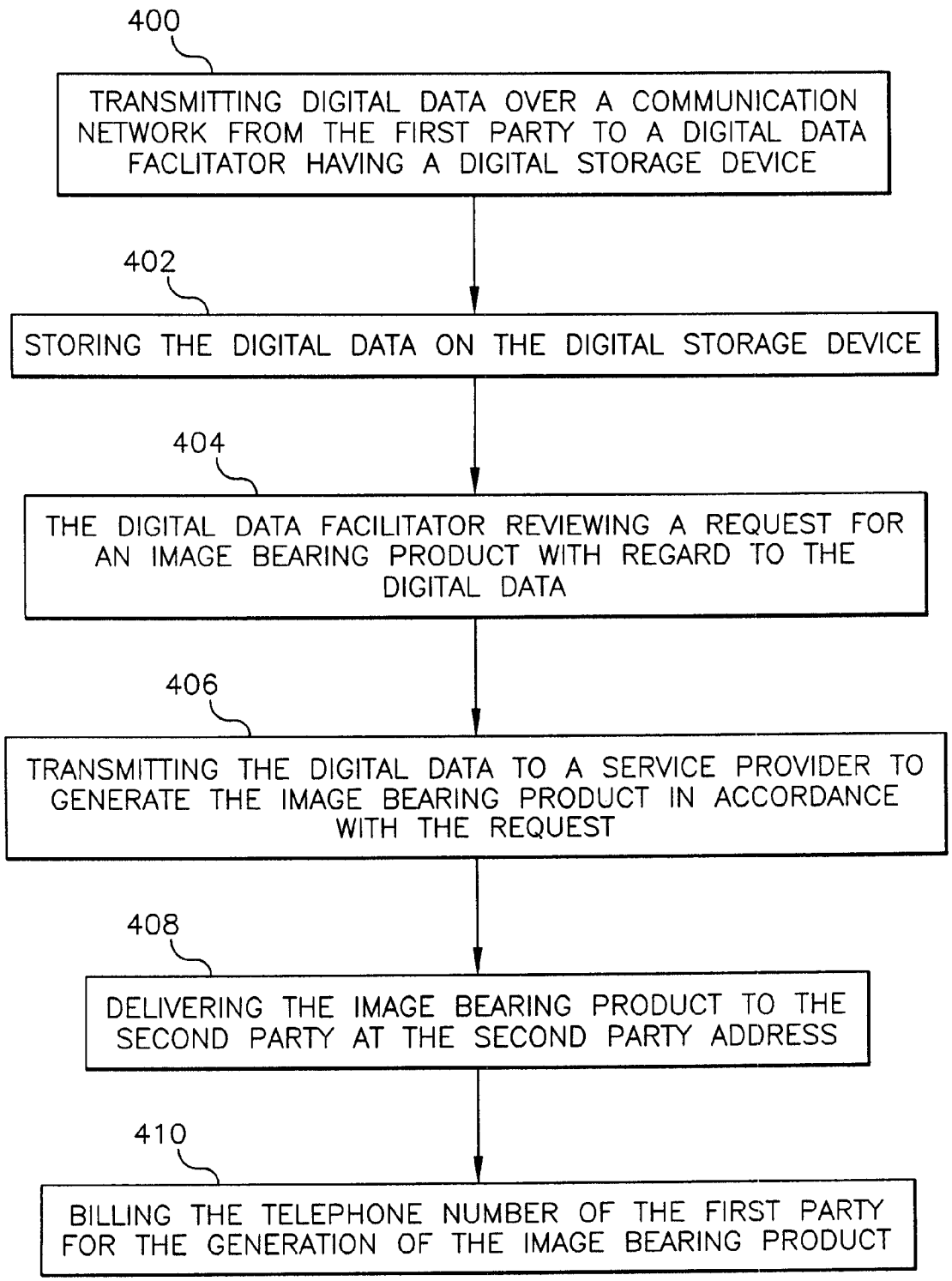
FIG. 12 shows a flow diagram of a method in accordance with the present invention employing the system of FIG. 11.

A diagram of a fourth method employing system 10 of FIG. 11 is shown in FIG. 12 for generating image bearing product 40. At step 400, digital data 16 is transmitted over communication network 18 from a first party to digital data facilitator 1 having digital storage device 14. Associated with digital data 16 is a first and second identifier, wherein the second identifier is associated with a delivery address of the second party, and the first identifier is associated with a telephone number of the first party. At step 402, digital data 16 is stored on digital storage device 14. A request for image bearing product 40 is transmitted by the first party, wherein the request and the product are with regard to digital data 16. At step 404, digital data facilitator 12 reviews the request, and then transmits digital data 16 to service provider 42 to generate image bearing product 40 in accordance with the request (step 406). Product 40 is delivered to the second party at the second party address (step 408). A fee is charged for the product at step 410. More particularly, the telephone number of the first party is billed for the generation of image bearing product 40.

At step 406, the digital data may not be available on storage device 14 for transmission to service provider 42. That is, if digital data 16 is stored on storage device 14 for a predetermined period of time, the predetermined period of time might have elapsed whereby digital data 16 is no longer available on storage device 14 for the generation of the image bearing product. Alternatively, digital data 16 stored on storage device 14 may be of a lower resolution than desired to generate image-bearing product 40. Accordingly, a request can be transmitted to the first party to re-transmit the digital data to digital data facilitator 12 so that image-bearing product 40 can be generated.

Such a re-transmittal of the digital data may be needed for the other embodiments described above. That is, for any of the embodiments described above, if an image bearing product is to be generated and digital data 16 does not reside on digital data facilitator 12, a data request can be transmitted to the first party to re-transmit the digital data so that the image bearing product can be generated. Alternatively, if higher resolution digital data is desired for the generation of the image-bearing product, a data request can be transmitted to the first party to transmit the higher resolution digital data. This request may occur the next time the first party contacts the digital data facilitator.

Accordingly, if the digital data is not residing on digital data facilitator 12, a method of generating an image bearing product would include the steps of storing the originally transmitted digital data on the digital storage device for a predetermined period of time, and then receiving a product request from the second party for the image bearing product after the elapse of the predetermined period of time. Thereafter, a data request is transmitted to the first party for the digital data, and the digital data is received in response to the data request. After which, the digital data is transmitted to a service provider to generate the image bearing product in accordance with the request and the image bearing product is delivered to the second party at the second party address. In a preferred arrangement, the telephone number of the first party is billed for the generation of the image bearing product.

Fifth Embodiment. In another embodiment, the second party may desire a print of a particular image. If a print is selected and there is no printing means connected to display device 22, a request is made to digital data facilitator 12 for a print. It is likely that the data for the print is not resident on storage device 14, or is of improper resolution for printing. Accordingly, a communication is made from digital data facilitator 12 to the first party by directly contacting the first party or by waiting until the next opportunity when the first party contacts the digital data facilitator. In this communication, a request is made of the first party to provide the data at adequate resolution for a print. If the high resolution print data is locally available, the data is transmitted to digital data facilitator 12. If not, the first party is instructed to provide the data. The high resolution print data at the digital data facilitator is transmitted to service provider 42 so that a print may be produced.

More than one recipient. It is recognized that the digital data can be shared with a plurality of recipients. That is, the first party can upload digital data 16 to digital data facilitator 12 and share this uploaded digital data with a plurality of second parties.

No Digital Data Facilitator. An alternative method, wherein no digital data facilitator 12 is employed, comprises the transmittal of a message to the second party from the first party instructing the second party to place display device 22 in the appropriate mode to receive digital data 16. The instructions can be accomplished audibly, and the second party may have options. For example, the first party's device may instruct the second party to "press 1" to delay the transmission or "press 2" to leave a message.

Preferred Embodiments. In a preferred embodiment of the present invention, shown in FIG. 13, the first party employs a digital device of a digital camera 50. The images captured by digital camera 50 can be uploaded/transmitted to digital data facilitator 12 for sharing with a second party. A modem can be employed. The transmission can be automatically accomplished if a digital camera docking station 52 is employed, an example of which is the EasyShare available from Eastman Kodak Company. The EasyShare dock connects directly to the computer. A modification is proposed that allows the dock to connect directly to telephone line 54.

In a preferred arrangement, a direct connection is provided to digital data facilitator 12 from digital camera/docking station 50,52 using a communication network of a telephone line 54. A local network can be employed so that only local telephone connections are necessary. Further, the transmission can occur in the evening or early morning to minimize the cost of the telephone line and for convenience. Digital camera 50 includes a microphone so that audio can be captured, for example, audio explaining the subject/content of the captured image.

Figure 13:
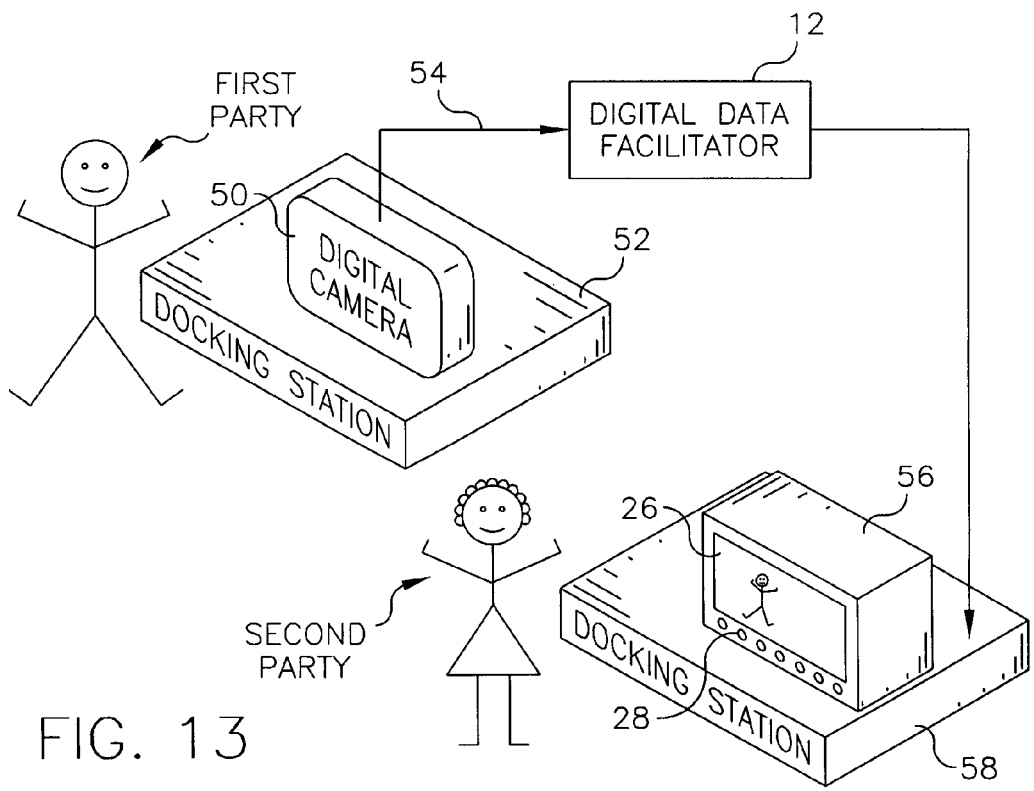
FIG. 13 illustrates a particular embodiment of the present invention wherein a digital camera is employed to transmit and receive the digital data.

The second party can employ display device 22 configured as a digital camera, shown in FIG. 13 as a digital camera 56. As with digital camera 50 of the first party, digital camera 56 of the second party can use a docking station 58 to automate features of the digital camera. For example, digital camera 56 can be configured to regularly query digital data facilitator 12. More particularly, digital camera 56 can be configured to query digital data facilitator 12 at 4 am. If no digital data is available for the second party, the modem disconnects as quickly as possible to reduce usage of the telephone line. If digital data is available, the digital data will be transmitted and fees will be charged for the telephone line usage. Alternatively, the second party can check for digital data at any time using the "check now" selection member 28 (best shown in FIG. 4). As more images (i.e., digital data) are transmitted, the longer the connection time, the higher the fee. These fees can be divided between the telecommunication company providing the connection and the company/service providing the service of digital data facilitator 12. The parties are billed directly through their telephone account(s).

Image area 26 of display device 22 can display the images to the second party as they are being transmitted. If display device 22 is configured as a digital camera, image area 26 is preferably positioned within docking station 58 so as to be facing the second party so that the images can be viewed as they are being transmitted.

Digital data 16 is of an appropriate resolution for the second party's digital display device (i.e., digital camera 56 for FIG. 13). For example, for FIG. 13, if the first party transmits images, the images transmitted to the second party are of a resolution appropriate for digital camera 56. Digital data facilitator 12 can maintain a database of the display device 22 of the second party. Alternatively, the request transmitted by the second party to digital data facilitator 12 can include a reference identifying the second party's display device to which digital data 16 will be transmitted. If the display device of the second party has a resolution higher than the resolution of the digital data transmitted to digital data facilitator 12 from the first party, then a request for higher resolution data may be returned to the first party via digital data facilitator 12.

In a preferred embodiment, high (or full) resolution images need not be transmitted by the first party to digital data facilitator 12 until and unless an image bearing product is desired. That is, a lower resolution image can be transmitted, then, if it is determined that the high resolution image is needed, a request can be transmitted from digital data facilitator 12 to the first party requesting the high resolution image ("please load the image into your digital camera for transmittal").

Digital data facilitator 12 can be configured to store digital data 16 for a predetermined period of time. After the predetermined time period, the digital data can be transferred off-line or deleted. Similarly, once the digital data has been accessed, the digital data can be transferred off-line or deleted.

The service provider can include a service of automatically generating a compact disc or other transportable/removable digital media after a predetermined time period comprising the digital data of the first and/or second party for delivery to the first and/or second party.

Figure 14:
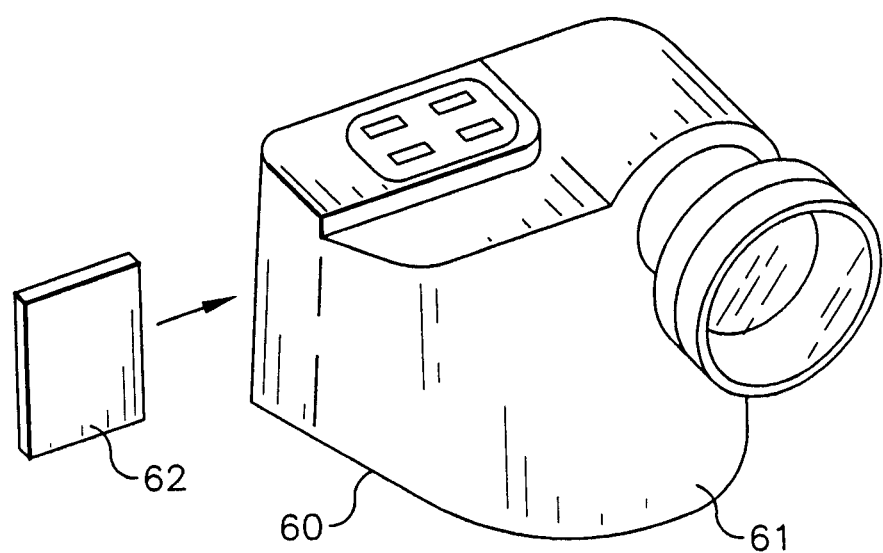
FIG. 14 shows an illustration of a typical digital camera.

Digital Camera. It has been disclosed that display device 22 can be configured as a digital camera. FIG. 14 generally illustrates a digital camera 60 comprising a housing 61 which is adapted to capture images in electronic form. Digital camera 60 captures digital images, which are stored on a removable memory device such as a removable memory stick or card 62. Removable memory cards 62 are known to those skilled in the art. For example, removable memory card 12 can include memory cards adapted to the PCMCIA card interface standard and the *CompactFlash Specification Version* 1.4, published by the CompactFlash Association, Palo Alto, Calif., 1998-1999. Other types of digital memory devices, such as magnetic hard drives, magnetic tape, CD, floppy disks, optical disks, or the like can alternatively be used to store the digital images.

Figure 15:
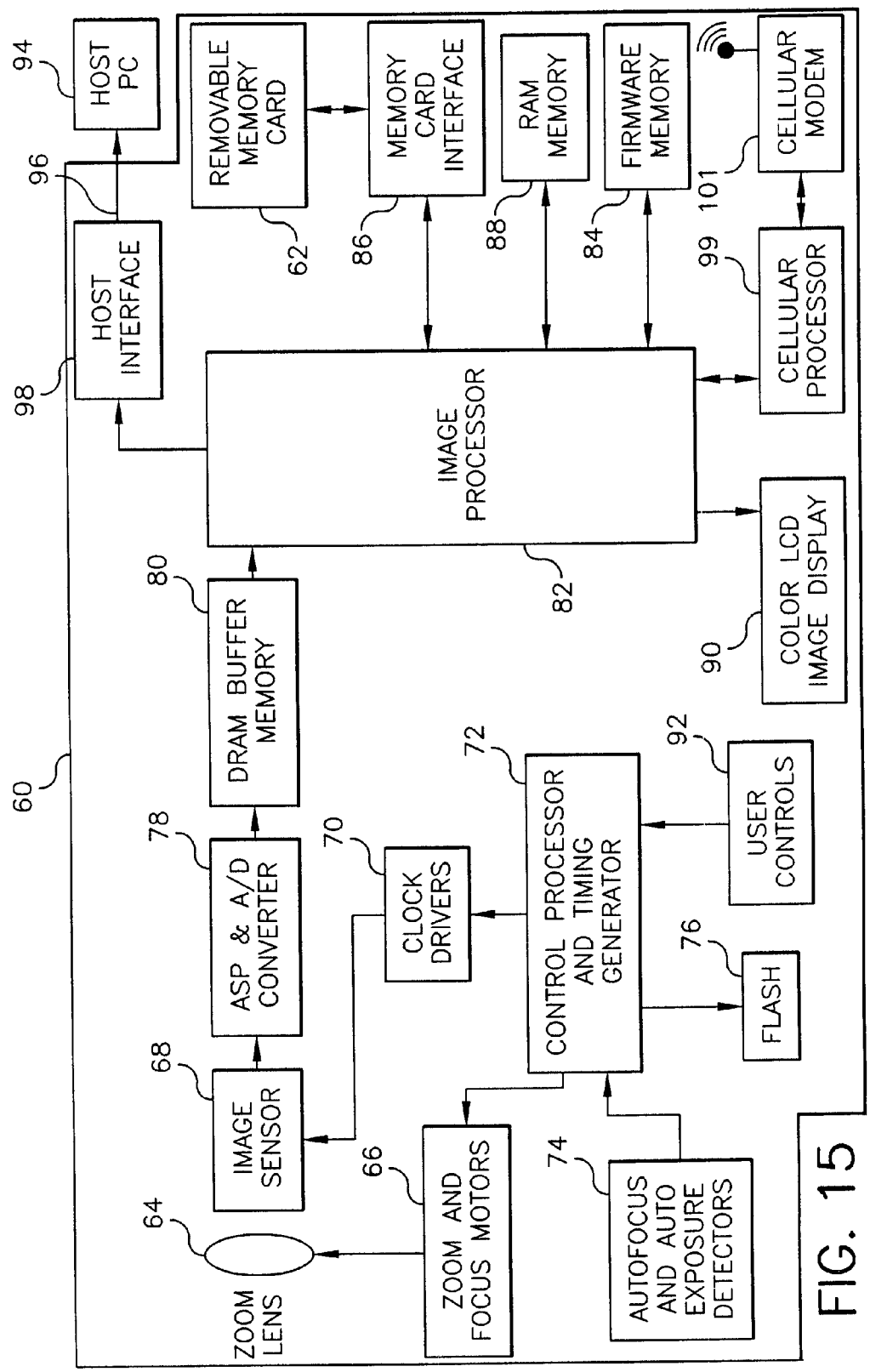
FIG. 15 shows a block diagram of the digital camera of FIG. 14.

FIG. 15 shows a block diagram of a typical digital camera 60 suitable for use with the method of the present invention. Digital camera 60 may include a zoom lens 64 having a zoom and focus motor 66 and an adjustable aperture and shutter (not shown). When an image is being captured using digital camera 60, zoom lens 64 focuses light from a scene being captured (not shown) onto an image sensor 68. Image sensor 68 may be, for example, a single-chip color charged couple device (CCD) image sensor, and may employ the well known Bayer color filter pattern. Image sensor 68 is controlled by a clock driver(s) 70. Zoom and focus motors 66 and clock driver 70 are controlled by control signals supplied by a control processor and timing generator 72. Control processor and timing generator 72 receives inputs from an autofocus and autoexposure detector 74 and controls a flash 76. An analog output signal from the image sensor 68 is amplified and converted to digital data by an analog signal processing (ASP) and analog-to-digital (A/D) converter 78. Digital data received from converter 78 is stored in a DRAM buffer memory 80 and subsequently processed by an image processor 82. Image processor 82 is controlled by firmware stored in a firmware memory 84, which can be, for example, flash EPROM memory.

Image processor 82 will process the image captured in accordance with instructions stored in firmware memory 84. Image processor 84 performs color interpolation followed by color and tone correction, in order to produce rendered sRGB image data. The rendered sRGB image data can then be compressed, for example using the well-known JPEG format. Using memory card interface 86, the compressed image data is then stored as an image file on removable memory card 62. Image processor 82 preferably creates an image that is stored in RAM memory 88 and supplied to a display 90, for example a color LCD display, which displays the captured image for the user to review.

Digital camera 60 is controlled by user controls 92, such as a series of user buttons including an actuation/capture button (e.g., shutter release) (not shown) which initiates an image capturing operation. A graphical user interface displayed on the color LCD image display 90 is controlled by a user interface portion of firmware stored in firmware memory 84.

The image captured by digital camera 60 can be transferred to a personal computer by removing removable memory card 62 from image capture device 60 and inserting removable memory card 62 in a card reader (not shown) in a computer 94, such as a home personal computer. Alternatively, an interface cable 96 can be used to connect between a host interface 98 in image capture device 60 and a CPU motherboard (not shown) in computer 94. Interface cable 96 can conform to, for example, the well-known universal serial bus (USB) interface specification. Digital camera 60 can comprise a cellular processor 99 adapted to initiate a cellular phone call by means of a cellular modem 101.

It is recognized that processor 82 can also create a "thumbnail" size image that is stored in RAM memory 88 and supplied to the color LCD image display 90, which displays the captured image for the user to review. This low-resolution "thumbnail" size image, can be created as described in commonly-assigned U.S. Pat. No. 5,164,831 (Kuchta). The thumbnail image has 160×120 pixels, and can be stored within an Exif image file along with the full resolution image. The Exif image files, containing the JPEG compressed main image, thumbnail image, and the image metadata, can be stored on removable memory card 62 using a directory structure conforming to the "DCF" rules. The file format known as Digital Printer Order Format (DPOF) can be employed by the service provider when an image bearing product is generated.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 system
12 digital data facilitator
14 digital storage device
16 digital data
18 communication network
19 transaction facilitator; monitor
20 request
22 display device 24 non-image area
26 image area
28 selection members
30 communication device
32 communication
34 identification system
36 facilitator identifier
38 indicator
40 image bearing product
42 service provider
50 digital camera; first party
52 docking station; first party
54 telephone line
56 digital camera; second party
58 docking station; second party
60 digital camera
61 housing; digital camera
62 removable memory device
64 zoom lens
66 zoom and focus motor
68 image sensor
70 clock drivers
72 control processing and timing generator
74 detectors
76 flash
78 converters
80 DRAM memory
82 image processor
84 firmware memory
86 memory card interface
88 RAM memory
90 image display
92 user controls
94 computer
96 communication network
98 host interface
99 cellular processor
101 cellular modem

What is claimed is:

1. A system for facilitating trusted asynchronous transmission of digital data, comprising:
a digital data facilitator coupled to a communication network and having a digital storage device configured to store digital image data received by the digital data facilitator over the communication network from a first device, the digital image data having a first identifier and a second identifier, the digital data facilitator configured to receive a regular query comprising an unsolicited digital request from a second device over the communication network, the digital request comprising the first identifier and the second identifier, wherein the digital data facilitator is further configured to transmit the digital image data and a facilitator identifier verifying the identity of the digital data facilitator to the second device in response to receiving the unsolicited digital request having the first identifier and the second identifier, wherein the facilitator identifier comprises a phone number associated with the digital data facilitator; and
an identification system associated with the second device that is configured to verify the facilitator identifier and, in response to a positive verification, to cause the second device to trust the digital data received from the digital data facilitator.

2. The system of claim 1, wherein the first identifier is an email address, phone number or IP address.

3. The system of claim 1, wherein the second identifier is an email address, phone number or IP address.

4. The system of claim 1, wherein the digital data facilitator is configured to:
receive, from the second device, a second regular query comprising a second unsolicited digital request comprising the second identifier; and
delay transmission of the digital image data to the second device.

5. The system of claim 1, wherein the digital data facilitator is further configured to transmit a notification to the first device in response to receiving the unsolicited digital request having the first identifier and the second identifier.

6. A method comprising:
receiving, at a digital data facilitator, digital data transmitted over a digital communication network, the digital data having a first identifier and a second identifier, the first identifier identifying a transmitter of the digital data;
electronically storing the digital data in a digital storage device of the digital data facilitator;
receiving, at the digital data facilitator, a regular query comprising an unsolicited digital request transmitted over the network, the unsolicited digital request comprising the first identifier and the second identifier, the second identifier associated with a transmitter of the digital request;
the digital data facilitator searching among the stored digital data for digital data that is both associated with the first identifier received in the digital request and with the second identifier received in the digital request; and
transmitting, from the digital data facilitator, both a facilitator identifier verifying the identity of the digital data facilitator and the digital data that is both associated with the first identifier and with the second identifier, wherein the facilitator identifier comprises a phone number associated with the digital data facilitator,
wherein the facilitator identifier causes the second device to trust the digital data received from the digital data facilitator in response to the facilitator identifier being verified.

7. The method of claim 6, wherein the first identifier is an email address, phone number or IP address.

8. The method of claim 6, wherein the second identifier is an email address, phone number or IP address.

9. The method of claim 6, further comprising:
receiving, from the second device, a second regular query comprising a second unsolicited digital request comprising the second identifier; and
delaying transmission of the digital image data to the second device.

10. The method of claim 6, further comprising transmitting a notification to the first device in response to receiving the unsolicited digital request having the first identifier and the second identifier.

11. A non-transitory computer readable medium having stored thereon instructions executable by a processor to cause a digital data facilitator to perform functions, the functions comprising:
receiving digital data transmitted over a digital communication network, the digital data having a first identifier and a second identifier, the first identifier identifying a transmitter of the digital data;
electronically storing the digital data in the digital storage device of the digital data facilitator;
receiving a regular query comprising an unsolicited digital request transmitted over the network, the unsolicited digital request comprising the first identifier and the second identifier, the second identifier associated with a transmitter of the digital request;

searching among the stored digital data for digital data that is both associated with the first identifier received in the digital request and with the second identifier received in the digital request; and transmitting both a facilitator identifier verifying the identity of the digital data facilitator and the digital data that is both associated with the first identifier and with the second identifier, wherein the facilitator identifier is designed to be verifiable by an identification system at the second device such that the second device may trust the digital data received from the digital data facilitator in response to the facilitator identifier being verified, and wherein the facilitator identifier comprises a phone number associated with the digital data facilitator.

12. The computer readable medium of claim 11, wherein the first identifier is an email address, phone number or IP address.

13. The computer readable medium of claim 11, wherein the second identifier is an email address, phone number or IP address.

14. The computer readable medium of claim 11, wherein the instructions are further executable to cause the digital data facilitator to:

receive, from the second device, a second regular query comprising a second unsolicited digital request comprising the second identifier; and delay transmission of the digital image data to the second device.

* * * * *

UNITED STATES PATENT AND TRADEMARK OFFICE
CERTIFICATE OF CORRECTION

| | | |
|---|---|---|
| PATENT NO. | : 8,667,053 B2 | Page 1 of 1 |
| APPLICATION NO. | : 11/934809 | |
| DATED | : March 4, 2014 | |
| INVENTOR(S) | : Fredlund et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1096 days.

Signed and Sealed this
Sixteenth Day of June, 2015

Michelle K. Lee
*Director of the United States Patent and Trademark Office*